(12) United States Patent (10) Patent No.: US 9,191,545 B2
Fukasawa (45) Date of Patent: Nov. 17, 2015

(54) IMAGE FORMING APPARATUS AND METHOD FOR IMPROVED UTILIZATION OF VIDEO MEMORY

(71) Applicant: KYOCERA Document Solutions Inc., Osaka (JP)

(72) Inventor: Yuki Fukasawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 125 days.

(21) Appl. No.: 14/189,784

(22) Filed: Feb. 25, 2014

(65) Prior Publication Data

US 2014/0240785 A1 Aug. 28, 2014

(30) Foreign Application Priority Data

Feb. 28, 2013 (JP) ................................. 2013-039452

(51) Int. Cl.
*G06K 15/02* (2006.01)
*H04N 1/32* (2006.01)
*G06F 12/02* (2006.01)

(52) U.S. Cl.
CPC ...... *H04N 1/3248* (2013.01); *H04N 2201/0091* (2013.01); *H04N 2201/0093* (2013.01); *H04N 2201/3288* (2013.01); *H04N 2201/3295* (2013.01)

(58) Field of Classification Search
None
See application file for complete search history.

(56) References Cited

U.S. PATENT DOCUMENTS

2009/0317120 A1* 12/2009 Miyahara ............. G03G 15/234
399/82
2010/0231931 A1* 9/2010 Tao ..................... H04N 1/32358
358/1.6

FOREIGN PATENT DOCUMENTS

JP 2010-000734 A 1/2010
JP 2010-213066 A 9/2010

* cited by examiner

*Primary Examiner* — Barbara Reinier
*Assistant Examiner* — Pawandeep Dhingra
(74) *Attorney, Agent, or Firm* — McDonnell Boehnen Hulbert & Berghoff LLP

(57) ABSTRACT

An image forming apparatus converts image data into a video signal, updates a value of a counter without loading the image data onto a video memory, if a print request is a single-sided print request and the image data corresponding to a page information included in the print request is stored on the video memory, and loads the image data corresponding to the page information in the print request onto the video memory, if the print request is a double-sided print request, or if the print request is the single-sided print request and the image data corresponding to the page information included in the print request is not stored on the video memory.

18 Claims, 6 Drawing Sheets

IMAGE FORMING APPARATUS AND METHOD FOR IMPROVED UTILIZATION OF VIDEO MEMORY

INCORPORATION BY REFERENCE

This application is based upon, and claims priority to corresponding Japanese Patent Application No. 2013-039452, filed in the Japan Patent Office on Feb. 28, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus and method including a video memory for an engine controller corresponding to a plurality of pages.

BACKGROUND

In a first typical image forming apparatus including a double-sided print function, high-speed printing is performed as follows. After an image is transferred onto a sheet (for example, a paper sheet) by a print engine, the sheet is conveyed and reversed to return to the print engine, while a succeeding sheet is then conveyed to the print engine to have an image transferred thereonto. In typical high-speed printing image forming apparatuses, a video memory of the print engine has a storage capacity that is capable of storing the data corresponding to a certain number of pages.

In a second typical image forming apparatus including an electronic sorting function used during the printing of a plurality of copies, a video memory of a print engine has a storage capacity that is capable of storing the data corresponding to a certain number of pages. In an example operation, image data on a subsequent page is to be transferred from a printing control unit to the video memory for an engine controller. When the image data on the page that has already been transferred at the previous time and remains on the video memory, the transfer of the image data on the subsequent page is omitted, and as a result, the image data on the page on the video memory is reused, thereby reducing the processing time.

SUMMARY

When the electronic sorting function and the high-speed printing are combined, and the printing is double-sided printing, the order in which the image data on pages are loaded onto the video memory is different from the order in which the image data on the pages are deleted from the video memory. The difference in the order causes free spaces to be scattered on the video memory and thus increases an idle state for a free space having a necessary size, which may deteriorate utilization efficiency of the video memory. This scattering in the video memory may be referred to as "fragmentation." When the utilization efficiency of the video memory deteriorates, performance of the image forming apparatus in the printing deteriorates.

The present disclosure relates to an image forming apparatus and method that improve utilization of a video memory, where the video memory may have a finite capacity that is capable of storing the data corresponding to a certain number of pages.

According to an embodiment of the present disclosure, an image forming apparatus includes a printing control unit and engine controller. The printing control unit includes a first page information queue including records, a buffer memory, an image processing section, and a page control section. The engine controller includes a video memory configured to store page data, a second page information queue, a counter, and a video memory control section.

The image processing section i) expands print data into image data, ii) stores the image data in the buffer memory; and iii) writes page information to the first page information queue. The page control section sends a print request including the page information to the video memory control section in an order based on the records in the first page information queue.

The video memory control section i) loads the image data corresponding to the page information in the buffer memory onto the video memory in response to receiving the print request, ii) sends a completion response, including the page information, indicating that the loading of the image data onto the video memory is completed to the page control section; and iii) writes the page information to the second page information queue.

Further, the page control section i) deletes the image data corresponding to the page information from the buffer memory in response to receiving the completion response, and ii) deletes the page information from the first page information queue.

Further, the video memory control section i) converts the image data into a video signal, ii) deletes the image data from the video memory based on a value of the counter, iii) deletes the page information corresponding to the image data from the second page information queue based on the value of the counter, iv) updates the value of the counter without loading the image data onto the video memory, if the print request is a single-sided print request and the image data corresponding to the page information included in the print request is stored on the video memory; and v) loads the image data corresponding to the page information in the print request onto the video memory, if the print request is a double-sided print request, or if the print request is the single-sided print request and the image data corresponding to the page information included in the print request is not stored on the video memory.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
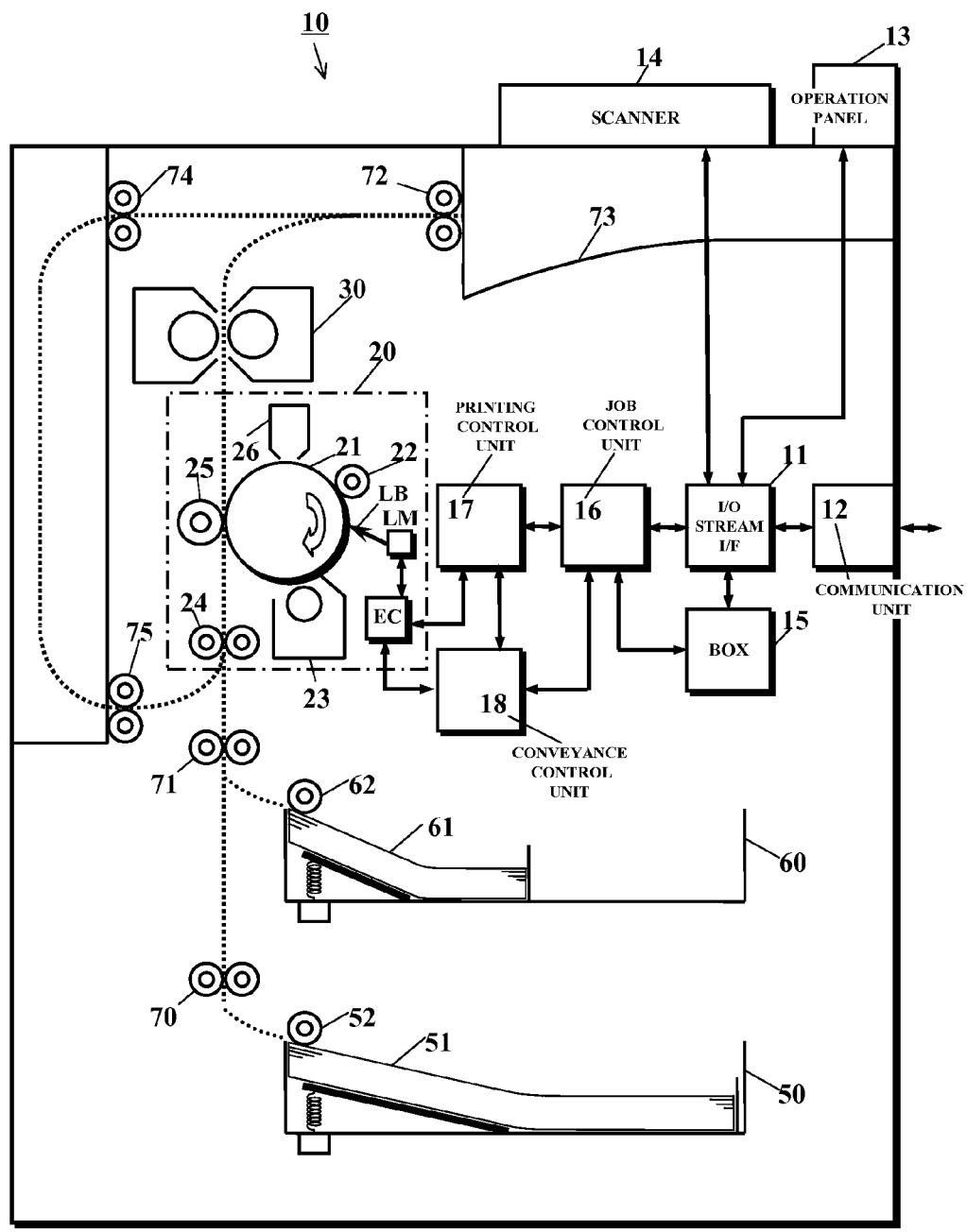
FIG. 1 is a schematic diagram illustrating a configuration of an image forming apparatus according to an embodiment of the present disclosure.

FIG. 1 is a schematic diagram illustrating a configuration of an image forming apparatus 10 according to an embodiment of the present disclosure.

An input/output (I/O) stream interface 11 receives print job data or facsimile data from an external portion via a communication unit 12. The I/O stream interface 11 receives image data obtained by converting an image of an original document read by a scanner 14, from an external input received via the communication unit 12, or an instruction received via an operation panel 13. The facsimile data and the image data are saved as a file in a storage unit 15, and the I/O stream interface 11 passes a path of the file to a job control unit 16. Storage unit 15 may be a standalone storage device capable of being read from and written to, or it may be a designated area within a storage device capable of being read from and written to, such as a directory or a folder within a file system of the storage device.

The job control unit 16 generates a job ID—which may be implemented as a universally unique identifier (UUID), for example—and manages a job associated with the saved file. The job control unit 16 reads contents of the saved file, and when a print request is received, sends an identifier of the saved file along with a print request to a printing control unit 17. The saved file may be formatted in a page description language (PDL), such as PostScript (PS), Portable Document Format (PDF), or the like. Accordingly, the saved file may be herein referred to as "PDL data."

Figure 2:
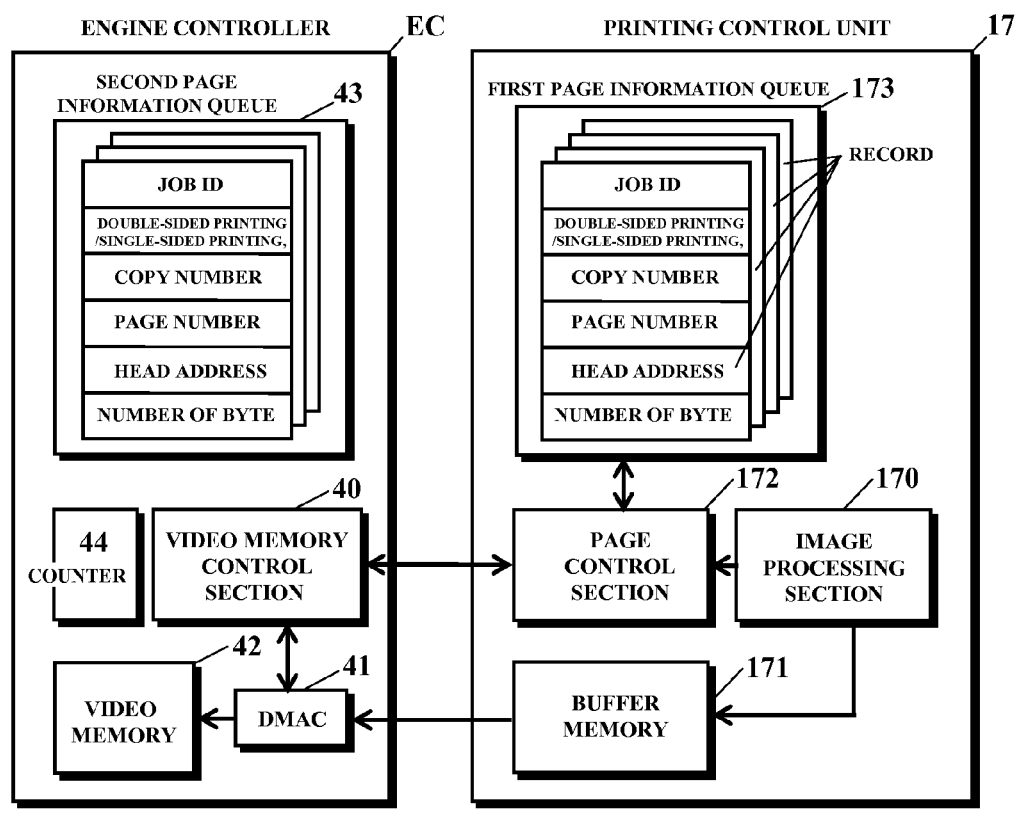
FIG. 2 is a block diagram illustrating a functional configuration of a printing control unit and an engine controller of the image forming apparatus.

FIG. 2 is a block diagram illustrating a functional configuration of the printing control unit 17 and an engine controller EC.

In the printing control unit 17, an image processing section 170 converts the PDL data into an intermediate code having a set of "bands" in response to the print request, then expands the intermediate code into a bitmap, and stores the bitmap in a buffer memory 171 for each page. The process of converting PDL data into a bitmap is generally referred to as "raster image processing." The image processing section 170 writes page information of each page to a first page information queue 173 via a page control section 172.

The page information includes records. Each record includes the job ID, a flag indicating whether to execute double-sided printing or single-sided printing, a copy number, a page number of a document of this job, a head address, and a number of bytes of bitmap data in the buffer memory 171. Note that single-sided printing is indicated by a single-sided print request flag, and that double-sided printing is indicated by a double-sided print request flag.

When the buffer memory 171 reaches a full state, the image processing section 170 suspends processing and is brought into a standby state. A full state is reached when the buffer memory 171 cannot store additional bitmap data because it has reached max storage capacity.

The page control section 172 sends the print request including the page information to a video memory control section 40 of the engine controller EC in an order of the records in the first page information queue 173.

In the engine controller EC, the video memory control section 40 refers to a second page information queue 43 to receive the print request when a video memory 42 is not in a full state. Based on the page information, the video memory control section 40 loads page image data corresponding to the page information in the buffer memory 171 onto the video memory 42 via a DMA controller (DMAC) 41. The video memory control section 40 then returns a completion response indicating that the loading of page image data is complete to the page control section 172 along with the page information. The video memory control section 40 overwrites the head address of the page information with the head address in the video memory 42, and writes the head address additionally to the second page information queue 43.

The page control section 172 deletes the page image data associated with the page information from in the buffer memory 171 after receiving the completion response. The page control section 172 also deletes the record of the page information from in the first page information queue 173, and cancels the standby state of the image processing section 170.

The image processing section 170 restarts the above-described process in response to the cancellation of the standby state.

Turning back to FIG. 1, in response to a request to start printing the next page, which is received from the engine controller EC, a surface of a photoconductor drum 21 is uniformly charged by a charge roller 22, and the corresponding image data in the video memory 42 is sequentially serialized based on contents of a head record in the second page information queue 43. A video signal containing a synchronizing signal is transmitted to a laser modulator LM illustrated in FIG. 1.

The laser modulator LM scans a laser beam LB on the photoconductor drum 21 while modulating the laser beam LB based on the video signal. With this operation, the charging on the photoconductor drum 21 is selectively canceled, an electrostatic latent image is formed on the photoconductor drum 21, and a developing device 23 causes toner to adhere to a charged portion to produce a toner image.

The printing control unit 17 causes the conveyance control unit 18 to feed a sheet 51 inside a sheet feeding stage 50 toward sheet conveying rollers 70 via a sheet feeding roller 52 or to feed a sheet 61 inside a sheet feeding stage 60 toward sheet conveying rollers 71 via a sheet feeding roller 62. The conveyance control unit 18 causes the sheet to be conveyed to registration rollers 24 of a print engine 20.

The engine controller EC controls the registration rollers 24 to temporarily stop conveyance of the sheet being fed via the sheet conveying rollers 71 and to restart the conveyance at a specified timing to feed the sheet between an electrostatic transfer roller 25 and the photoconductor drum 21. The electrostatic transfer roller 25 electrostatically transfers the toner image on the photoconductor drum 21 onto the fed sheet. Under control of the conveyance control unit 18, the sheet onto which the toner image has been transferred is heated and pressed while passing via a fixing device 30, to thereby fix the toner image to the sheet. The toner remaining on the photoconductor drum 21 after a transfer is removed by a cleaner 26.

In a case of the single-sided printing, the sheet is delivered face down onto a delivery tray 73 via delivery rollers 72. In a case of the double-sided printing and normal-speed printing, a sheet surface reverse operation is performed before the delivery. That is, rotations of the delivery rollers 72 are reversed to switch back the sheet via sheet conveying rollers 74 and 75, and the sheet is returned to the registration rollers 24 of the print engine 20, thus resulting in the top and bottom edges being reversed and the front and back surfaces being reversed.

In a case of the double-sided printing and high-speed printing utilizing the sheet surface reverse operation, a succeeding sheet is fed from the sheet feeding stage 50 or the sheet feeding stage 60 to the registration rollers 24, while the reversed sheet stands by at the sheet conveying rollers 74 (in case of the second sheet on standby) or the sheet conveying rollers 75 (in case of the first sheet on standby). The sheet on standby is subjected to the transfer and the fixing in the same manner as described above, and is further delivered face down onto the delivery tray 73 from the delivery rollers 72.

Figure 3A:
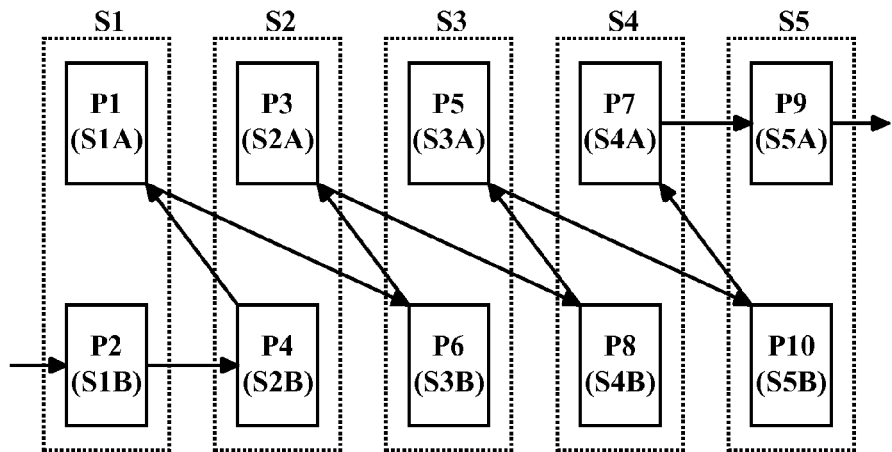
FIG. 3A is a schematic diagram illustrating a printing order of page image data in a case of high-speed double-sided printing.

FIG. 3A is a schematic diagram illustrating a printing order of the page image data in a case of high-speed double-sided printing.

A page image Pi, where i=1 to 10, indicates that a document page number is i. Sj, where j=1 to 5, represents an identification number of the sheet to be printed. A or B appended to Sj represents a front surface or a back surface, respectively, of the sheet to be delivered face down. Further, the arrows in FIG. 3A indicate the printing order.

In the printing order, first, a page image P2 is transferred onto a sheet S1B, and the sheet S1B is reversed and put on standby (S1A), while simultaneously a page image P4 is transferred onto a sheet S2B. Subsequently, the sheet S2B is reversed and put on standby (S2A), while a page image P1 is transferred onto the sheet S1A. Subsequently, a page image P6 is transferred onto a sheet S3B, while the sheet S3B is reversed and put on standby (S3A). Subsequently, a page image P3 is transferred onto the sheet S2A. Such an operation is sequentially performed.

Figure 3B:
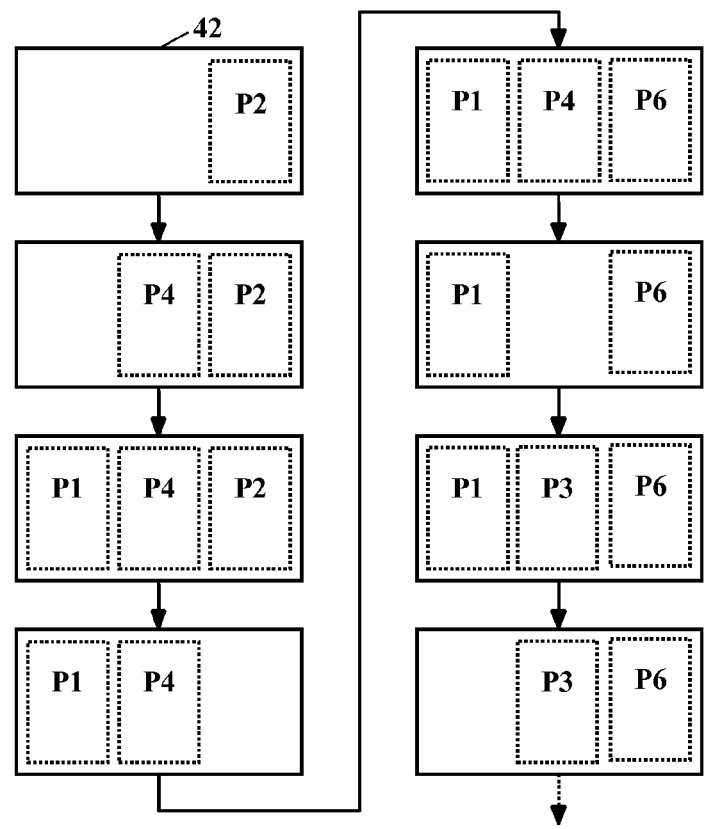
FIG. 3B is a schematic diagram illustrating a sequential process of the page image data existing in a video memory of the engine controller in the case of the high-speed double-sided printing.

FIG. 3B is a schematic diagram illustrating a temporal change of the page image data existing in the video memory 42 in the case of the high-speed double-sided printing. In this embodiment, the video memory 42 has a capacity whose size is three times as large as a size of a standard page image.

First, the page image P2 to be transferred onto the sheet S1B is loaded into the video memory 42. Subsequently, the page image P4 to be transferred onto the sheet S2B is loaded into video memory 42. Then, the page image P1 to be transferred onto the sheet S1A is loaded into video memory 42, and the video memory 42 reaches a full state.

When a serial transfer of the video signal of the page image P2 to the laser modulator LM is completed—that is, when the exposure thereof to the photoconductor drum 21 is completed—the image is deleted from in the video memory 42, thereby producing free space. Subsequently, the page image P6 to be transferred onto the sheet S3B is loaded into the video memory 42, and the video memory 42 reaches a full state. Such an operation is sequentially performed.

Figure 4:
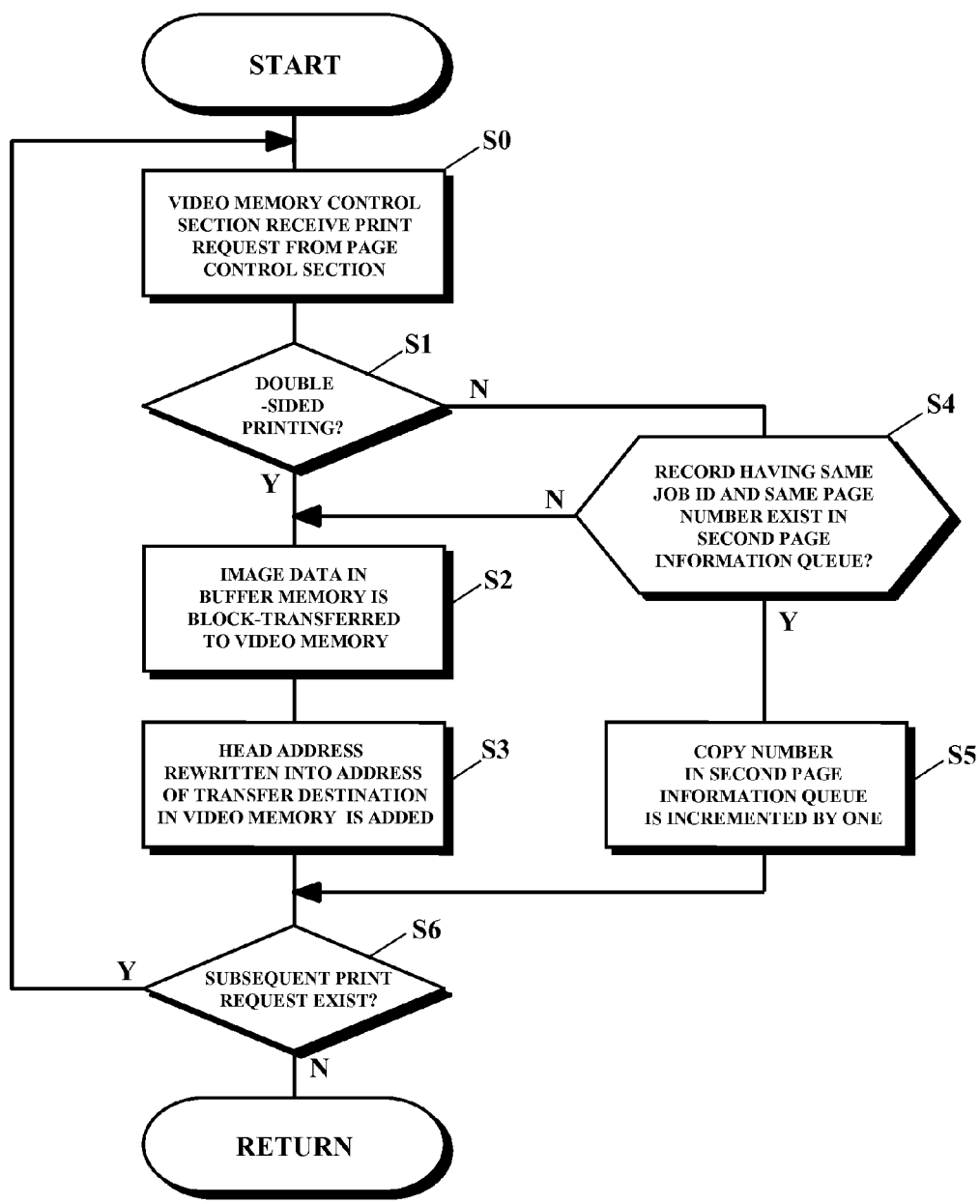
FIG. 4 is a flowchart illustrating a process performed by a video memory control section of the engine controller.

FIG. 4 is a flowchart illustrating a process performed by the video memory control section 40. This process is started by the print request received from the page control section 172.

In Step S0, the video memory control section 40 receives the print request from the page control section 172. The print request includes the records illustrated in FIG. 2 in the first page information queue 173.

In Step S1, when the flag indicating double-sided printing or single-sided printing indicates the double-sided printing, the process advances to Step S2, and otherwise, advances to Step S4.

In Step S2, the video memory control section 40 sets the head address and the number of bytes for the DMA controller 41, and sets the head address of the transfer destination in the video memory 42, to cause the DMA controller 41 to operate. With this operation, the image data in the buffer memory 171 is block-transferred to a specified area in the video memory 42.

During double-sided printing, even when the same page image exists in the video memory 42, the same page image is not reused, and instead, the image data in the buffer memory 171 is block-transferred to the specified area in the video memory 42. The block-transferred page image and deletion process illustrated in FIG. 5 cause the same image data to be displaced in position in the video memory 42, and defragmentation is substantially performed.

In Step S3, the head address, received from the page control section 172, that is rewritten into the address of the transfer destination in the video memory 42 is added to the second page information queue 43. Subsequently, the process advances to Step S6.

In Step S4, when the record having the same job ID and the same page number as those in the first page information queue 173 exists in the second page information queue 43, the process advances to Step S5, and otherwise, the process advances to Step S2.

In Step S5, the copy number in the second page information queue 43 is incremented by one. During single-sided printing, the same page image existing in the video memory 42 is reused.

In Step S6, when the subsequent print request exists, the process returns to Step S0, and when the subsequent print request does not exist, the process illustrated in FIG. 4 is brought to an end.

Figure 5:
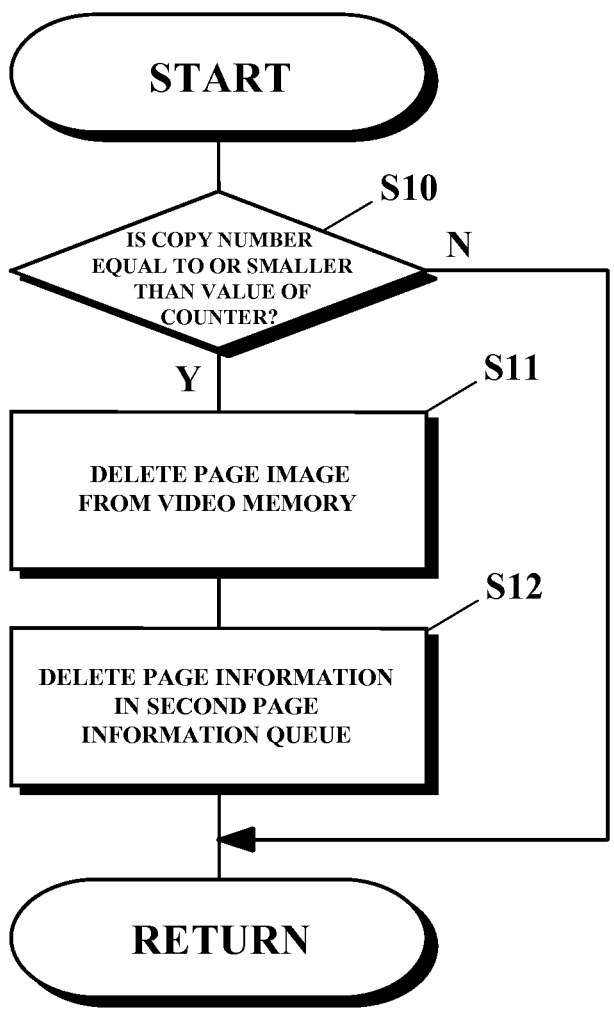
FIG. 5 is a flowchart illustrating a process started in response to the fact that image data in the video memory corresponding to one page has been transferred by the video memory control section.

FIG. 5 is a flowchart illustrating a process started in response to the image data in the video memory 42 corresponding to one page being transferred to the laser modulator LM by the video memory control section 40.

In Step S10, the video memory control section 40 advances the process to Step S11 if the copy number of the record that includes the job ID and the page number relating to the transfer completion in the second page information queue 43 is equal to or smaller than a value of a counter 44. If that copy number is greater than the value of counter 44, the process of FIG. 5 returns.

The engine controller EC includes the counter 44 (which may be implemented, for example, as a software counter) illustrated in FIG. 2. The initial value of the counter 44 is one for each job. The engine controller EC increments the value of the counter 44 by one for each job every time all the pages of the document are printed.

In Step S11, the page image is deleted from the video memory 42.

In Step S12, the page information that corresponds to the page image in the second page information queue 43 is deleted.

Figure 6A:
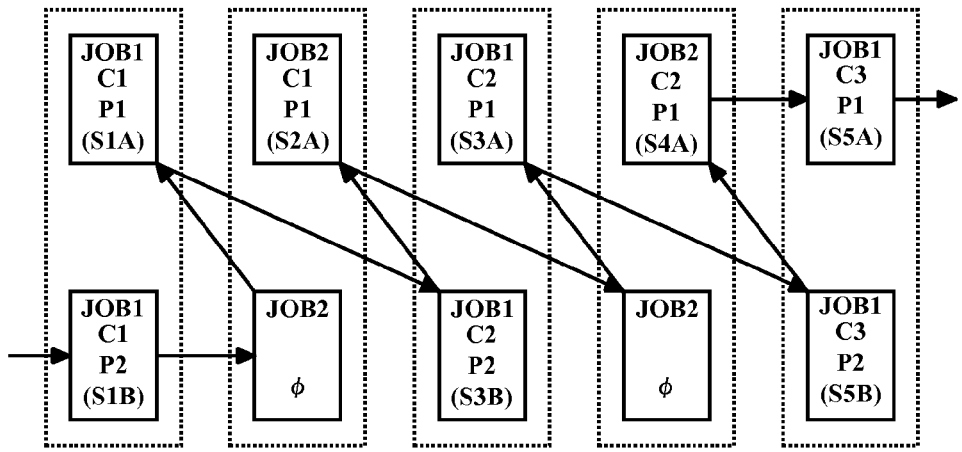
FIG. 6A is a schematic diagram illustrating the printing order in an example in which a job 1, specifying three copies of a document formed of page images P1 and P2 are subjected to double-sided printing and electronically sorted, and a job 2, specifying two copies of a document formed of the page image P1 are subjected to single-sided printing, coexist and are continuously processed.

FIG. 6A is a schematic diagram illustrating the printing order in an example in which a job 1 (JOB1), specifying three copies of a document formed of the page image P1 and the page image P2 are subjected to the double-sided printing and electronically sorted, and a job 2 (JOB2), specifying two copies of a document formed of the page image P1 are subjected to the single-sided printing, coexist and are continuously processed. Ck, where k=1 to 3, represents the k-th copy to be printed.

The single-sided printing of the job 2 is performed by printing a blank (denoted by Φ in FIG. 6A) on one of the two sides.

Figure 6B:
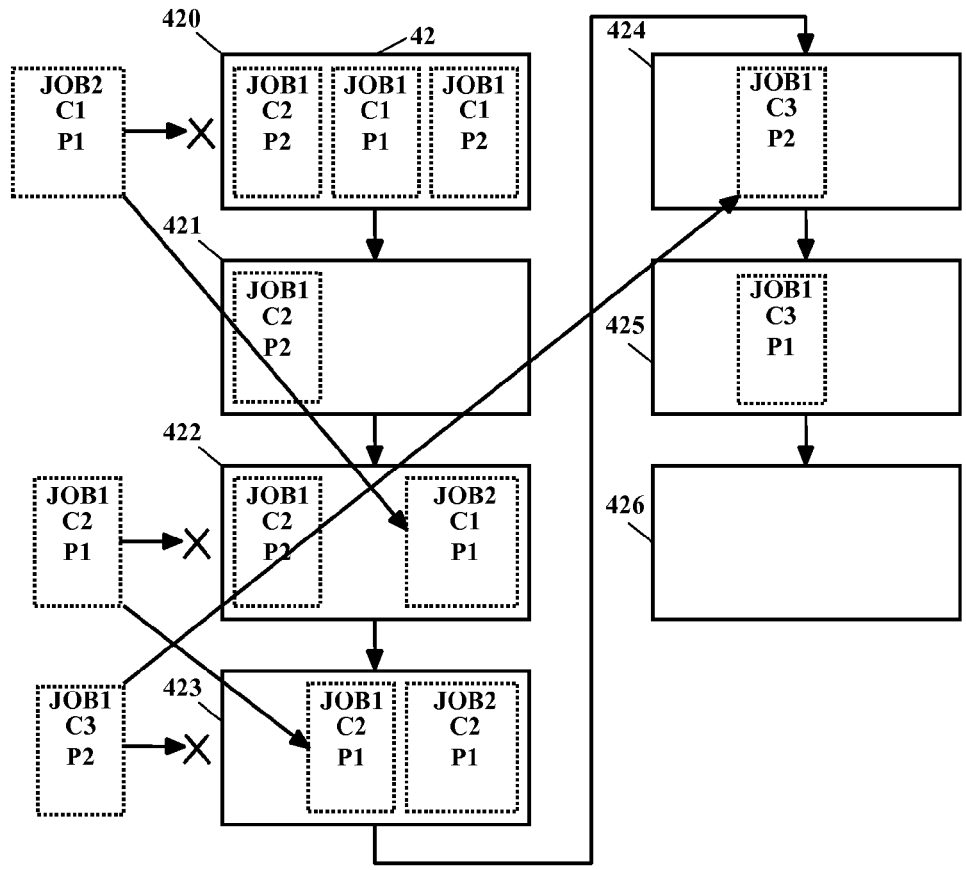
FIG. 6B is a schematic diagram illustrating a sequential process of the page image data stored in the video memory in the example illustrated in FIG. 6A.

FIG. 6B is a schematic diagram illustrating the sequential process of page-to-page-basis image data stored in the video memory 42 in the example illustrated in FIG. 6A. In FIG. 6A, it is assumed that the image data on the page image P1 of the job 2 is larger in size than a standard size, and hence images corresponding to the two more pages cannot be loaded into the video memory 42 when the page image P1 is stored in the video memory 42.

The images mutually having the same job number and the same page number are the same image regardless of the copy number Ck.

At step 420, the first copy of the page images P2 and P1 of the job 1 is loaded into the video memory 42. In the double-sided printing, even the same page image is loaded into the video memory 42 (Step S2 of FIG. 4), and hence the page image P2 of the second copy of the job 1 is loaded into the video memory 42. Accordingly, the video memory 42 reaches a full state, and the loading of the page image P1 of the job 2 is put into an idle state.

At step 421, the loading of the page image P1 of the job 2 is kept in the idle state until the page images P2 and P1 of the job 1 are deleted by the process illustrated in FIG. 5, because an image size of the page image P1 of the job 2 is large. In the double-sided printing, the page images are deleted in an order in which the page images were written in Step S2 of FIG. 4 by the process illustrated in FIG. 5, and hence continuous spaces are deleted, thereby reserving a free space having a large size for the page image P1 of the job 2. That is, when the page image P2 of the job 1 is displaced, the continuous spaces make the free space, and the defragmentation is performed.

This process can prevent the spaces in the video memory 42 from being scattered or "fragmented," thereby improving utilization efficiency of the video memory 42.

At step 422, the page image P1 of the job 2 is loaded into the video memory 42.

At step 423, the page image P2 of the second copy of the job 1 is deleted by the process illustrated in FIG. 5, and the page image P1 of the second copy of the job 1 is added into the video memory 42 by the process illustrated in FIG. 4.

At step 424, the page image P2 of the third copy of the job 1 is loaded, and the page image P1 of the job 2 is deleted.

At step 425, the page image P1 of the third copy of the job 1 is loaded.

At step 426, the page image P1 of the third copy of the job 1 is deleted.

While various aspects and embodiments have been disclosed herein, other aspects and embodiments are possible. Other designs may be used in which the above-described components are each present.

For example, the above-described embodiment is described by taking an example of using the copy number as the page information. For example, the following configuration may be employed. Instead of the copy number, there may be a counter for counting the remaining number of pages to be printed, the initial value of which is one, and the counter is decremented by one in Step S10 of FIG. 5. When a counter value reaches zero, the process advances to Step S11. Otherwise, the process of FIG. 5 returns. In another example, in Step S5 of FIG. 4, the counter for the remaining number of pages to be printed may be incremented by one.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a printing control unit including:
      a first page information queue including records;
      a buffer memory;
      an image processing section; and
      a page control section; and
   an engine controller including:
      a video memory configured to store page data;
      a second page information queue;
      a counter; and
      a video memory control section,
   wherein the image processing section is configured to:
      i) expand print data into image data;
      ii) store the image data in the buffer memory; and
      iii) write page information to the first page information queue;
   wherein the page control section is configured to send a print request including the page information to the video memory control section in an order based on the records in the first page information queue;
   wherein the video memory control section is configured to:
      i) load the image data corresponding to the page information in the buffer memory onto the video memory in response to receiving the print request;
      ii) send a completion response, including the page information, indicating that the loading of the image data onto the video memory is complete to the page control section; and
      iii) write the page information to the second page information queue;
   wherein the page control section is further configured to:
      i) delete the image data corresponding to the page information from the buffer memory in response to receiving the completion response; and
      ii) delete the page information from the first page information queue; and
   wherein the video memory control section is further configured to:
      i) convert the image data into a video signal;
      ii) delete the image data from the video memory based on a value of the counter;

iii) delete the page information corresponding to the image data from the second page information queue based on the value of the counter;

iv) update the value of the counter without loading the image data onto the video memory, if the print request is a single-sided print request and the image data corresponding to the page information included in the print request is stored on the video memory; and v) load the image data corresponding to the page information in the print request onto the video memory, if the print request is a double-sided print request, or if the print request is the single-sided print request and the image data corresponding to the page information included in the print request is not stored on the video memory.

2. The image forming apparatus according to claim 1, wherein the page information includes a job ID, a flag indicating whether the print request is the double-sided print request or the single-sided print request, a copy number, and a page number.

3. The image forming apparatus according to claim 1, wherein the printing control unit receives a print job comprising the print data to be processed, and wherein the engine controller is configured to increment the counter after the print job is processed.

4. The image forming apparatus according to claim 3, wherein the value of the counter includes a copy number; and
wherein the updating of the value of the counter includes a process for incrementing the copy number by one.

5. The image forming apparatus according to claim 4, wherein the video memory control section is configured to, after the image data is converted into the video signal, delete the page information and the image data when the copy number is equal to or smaller than the value of the counter.

6. The image forming apparatus according to claim 4, wherein the video memory control section is configured to decrement the counter by one after the image data is converted into the video signal, and delete the page information and the image data when the value of the counter is equal to zero.

7. An image forming method by an image forming apparatus comprising a printing control unit and an engine controller,
wherein the printing control unit includes a first page information queue including records, buffer memory, an image processing section, and a page control section; and
wherein the engine controller includes a video memory configured to store page data, a second page information queue, a counter, and a video memory control section,
wherein the image forming method comprises:
expanding print data into image data;
storing the image data in the buffer memory;
writing page information to the first page information queue;
sending a print request including the page information to the video memory control section in an order based on the records in the first page information queue;
loading the image data corresponding to the page information in the buffer memory onto the video memory in response to receiving the print request;
sending a completion response, including the page information, indicating that the loading of the image data onto the video memory is complete to the page control section;

writing the page information to the second page information queue;
deleting the image data corresponding to the page information from in the buffer memory in response to receiving the completion response;
deleting the page information from the first page information queue;
converting the image data into a video signal;
deleting the image data from the video memory based on a value of the counter;
deleting the page information corresponding to the image data from the second page information queue based on the value of the counter;
updating the value of the counter without loading the image data onto the video memory, if the print request is a single-sided print request and the image data corresponding to the page information included in the print request is stored on the video memory; and
loading the image data corresponding to the page information in the print request onto the video memory, if the print request is a double-sided print request, or if the print request is the single-sided print request and the image data corresponding to the page information included in the print request is not stored on the video memory.

8. The image forming method according to claim 7, wherein the page information includes a job ID, a flag indicating whether the print request is the double-sided print request or single-sided print request, a copy number, and a page number.

9. The image forming method according to claim 7, wherein the printing control unit receives a print job comprising the print data to be processed, and
wherein the engine controller is configured to increment the counter after the print job is processed.

10. The image forming method according to claim 7, wherein the value of the counter includes a copy number; and
wherein the updating of the value of the counter includes process for incrementing the copy number by one.

11. The image forming method according to claim 10, wherein the video memory control section is configured, after the image data is converted into the video signal, to delete the page information and the image data when the copy number is equal to or smaller than the value of the counter.

12. The image forming method according to claim 10, wherein the video memory control section is configured to decrement the counter by one after the image data is converted into the video signal, and delete the page information and the image data when the value of the counter is equal to zero.

13. A non-transitory computer readable medium having stored thereon instructions, that when executed by a processor, cause performance of a set of functions on an image forming apparatus comprising a printing control unit and an engine controller:
wherein the printing control unit includes a first page information queue including records, buffer memory, an image processing section, and a page control section; and
wherein the engine controller includes a video memory configured to store page data, a second page information queue, a counter, and a video memory control section,
wherein the set of functions comprises:
expanding print data into image data;
storing the image data in the buffer memory;

writing page information to the first page information queue;

sending a print request including the page information to the video memory control section in an order based on the records in the first page information queue;

loading the image data corresponding to the page information in the buffer memory onto the video memory in response to receiving the print request;

sending a completion response, including the page information, indicating that the loading of the image data onto the video memory is complete to the page control section;

writing the page information to the second page information queue;

deleting the image data corresponding to the page information from in the buffer memory in response to receiving the completion response;

deleting the page information from the first page information queue;

converting the image data into a video signal;

deleting the image data from the video memory based on a value of the counter;

deleting the page information corresponding to the image data from the second page information queue based on the value of the counter;

updating the value of the counter without loading the image data onto the video memory, if the print request is a single-sided print request and the image data corresponding to the page information included in the print request is stored on the video memory; and loading the image data corresponding to the page information in the print request onto the video memory, if the print request is a double-sided print request, or if the print request is the single-sided print request and the image data corresponding to the page information included in the print request is not stored on the video memory.

14. The non-transitory computer-readable medium according to claim 13,
wherein the page information includes a job ID, a flag indicating whether the print request is the double-sided print request or single-sided print request, a copy number, and a page number.

15. The non-transitory computer-readable medium according to claim 13,
wherein the printing control unit receives a print job comprising the print data to be processed, and
wherein the engine controller is configured to increment the counter after the print job is processed.

16. The non-transitory computer-readable medium according to claim 13,
wherein the value of the counter includes a copy number; and
wherein the updating of the value of the counter includes a process for incrementing the copy number by one.

17. The non-transitory computer-readable medium according to claim 16,
wherein the video memory control section is configured, after the image data is converted into the video signal, to delete the page information and the image data when the copy number is equal to or smaller than the value of the counter.

18. The non-transitory computer-readable medium according to claim 16,
wherein the video memory control section is configured to decrement the counter by one after the image data is converted into the video signal, and delete the page information and the image data when the value of the counter is equal to zero.

* * * * *